United States Patent
Elliott et al.

[11] 3,859,357
[45] Jan. 7, 1975

[54] INSECTICIDES

[75] Inventors: Michael Elliott, Harpenden; Norman Frank Janes, Luton, both of England

[73] Assignee: National Research Development Corporation, London, England

[22] Filed: July 11, 1972

[21] Appl. No.: 270,635

Related U.S. Application Data

[62] Division of Ser. No. 52,084, July 2, 1970, Pat. No. 3,720,703.

[52] U.S. Cl. .............................................. 260/590
[51] Int. Cl. ............................................ C07c 47/80
[58] Field of Search ....................... 260/590, 468 H

[56] References Cited
UNITED STATES PATENTS 2,603,652   7/1952   Schechter et al. .............. 260/468 H
2,768,965   10/1956   Stansbury et al. .............. 260/468 H Primary Examiner—Daniel D. Horwitz
Attorney, Agent, or Firm—Cushman, Darby & Cushman

[57] ABSTRACT

Cyclopentenones of the general formula

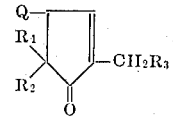

where Q represents halogen or hydroxy, $R_1$ and $R_2$ represent hydrogen or alkyl and $R_3$ represents aryl, useful as intermediates in the preparation of insecticidal cyclopentenoneyl chrysanthemates and analogues thereof, are prepared by halogenating the cyclopentenone where Q = H and, if desired converting the halogen to hydroxy.

2 Claims, No Drawings

INSECTICIDES

This is a division of application Ser. No. 52084, now U.S. Pat. No. 3,720,703 filed July 2, 1970.

This invention relates to insecticides and more particularly to synthetic insecticides of the pyrethroid class and to their preparation and to compositions containing them.

For many years, research has been pursued in the field of synthetic analogues of the pyrethrins in order to discover synthetic substitutes having properties superior to those of the natural products. Insecticidal toxicity and knock-down are important but also important are low toxicity to mammals and lack of persistence of toxic residues to contaminate the environment. Ideally, synthetic analogues of the pyrethrins should compare well with the natural products as regards level of toxicity to insects and mammals, insecticidal spectrum, and knock-down properties, and in addition should offer ease of manufacture. Very few synthetic compounds have fulfilled all these requirements and fewer still have shown an improvement over the natural pyrethrins in biological properties whilst at the same time being simple to prepare.

The pyrethrins are esters of certain substituted cyclopropane carboxylic acids and substituted cyclopentenolones, and in many synthetic analogues, that part of the ester which derives from the alcohol has been modified. Thus, analogues have been prepared from cyclopentenolones containing substituents at the 2-position which are different from those present in the natural products. Important advances have also been made with the use of entirely different alcohols derived, for example, from the aromatic and heterocyclic series. Most modifications of the cyclopentenolone ring have been restricted to varying the nature of the 2-substituent but the 3-methyl group present in the natural products has invariably been retained in the synthetic analogues prepared.

It has now been found that substituted cyclopentenolones which have no methyl group at position 3 give rise to esters which compare well and, in some cases, surpass pyrethrins in at least one of the desired properties whilst being, for the most part, relatively easy to prepare.

Accordingly, the present invention provides compounds of the general formula:

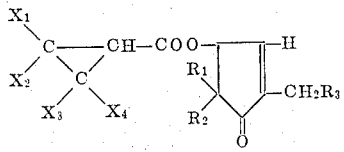

wherein $X_1$ represents a halogen, alkenyl or aryl group, $X_2$, $X_3$ and $X_4$, which may be the same or different, each represents hydrogen or a halogeno, alkyl or aryl group, $R_1$ and $R_2$ which may be the same or different, each represent hydrogen or an alkyl group and $R_3$ represents an organic radical having carbon to carbon unsaturation in a position $\alpha$ to the $CH_2$ group to which $R_3$ is bonded.

When alkyl, alkenyl, alkynyl or alkoxy substituents are present in compounds of the invention, it is preferred that they contain not more than 6 and more preferably not more than four carbon atoms and the prefix 'lower', when used, indicates this preferred carbon atoms content. The terms alkyl, alkenyl etc. include cyclo-alkyl, cyclo-alkenyl etc. and sites of unsaturation in cyclic groups may be endocyclic or exocyclic.

The new pyrethroids according to the present invention are formally derivable from alcohols of general formula I:

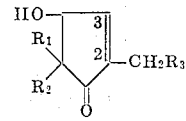

wherein $R_1$, $R_2$ and $R_3$ are as defined above.

However, it is, in practice, less convenient to prepare the esters by an esterification reaction than to proceed by way of the corresponding halogeno derivative of general formula II:

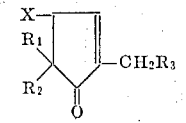

wherein $R_1$, $R_2$ and $R_3$ are as defined above and X is a halogeno group, preferably bromine or chlorine. Indeed, proceeding through the halogeno derivative is especially convenient in that the halogeno compound need not be isolated from the reaction medium in which it is produced but can be immediately converted into the appropriate ester by reaction with a functional derivative of the desired acid, e.g. a suitable salt thereof such as a silver salt or an amine salt, e.g. a triethylamine salt. The compound of formula II can, if desired, be converted to the alcohol of formula I by reaction with silver acetate and hydrolysis of the acetate of the alcohol with alkali.

The alcohols and corresponding halogeno compounds illustrated above are included in the scope of the present invention. Examples of compounds which may be used in the present invention are those in which $R_1$ and $R_2$ are selected from hydrogen, methyl or ethyl, and $R_3$ represents aryl including phenyl and substituted phenyl containing halogeno, lower alkyl, lower alkoxy substituents, e.g. telyl, xylyl, p-chlorophenyl, p-methoxyphenyl. $R_3$ may also represent 2- or 3- furyl. $R_3$ may alternatively represent an alkenyl group such as vinyl or prop-1-enyl or but-1,3-dienyl.

The insecticidal esters of the present invention are derivable compounds from the substituted cyclopropane carboxylic acid

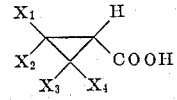

wherein $X_1$, $X_2$, $X_3$ and $X_4$ are as defined above and specific examples of carboxylic acids which may be converted into the esters of this invention are:

Chrysanthemic and pyrethric acids ($X_1$ = isobutenyl or 2-methoxycarbonyl-prop-1-enyl respectively, $X_2$ = H, $X_3 = X_4 - CH_3$) including the ($\pm$)-cis-trans, ($\pm$)-trans, ($\pm$)-cis, (+)-trans and (+)-cis isomers thereof, the isomers of 2,2-dimethyl-3-(cyclopentylidenemethyl)-cyclopropane carboxylic acid, 2,2-dimethyl, 2,3-dimethyl, 2,3,3-trimethyl, 2,2,3,3-tetramethyl, 2,2,3,3-tetraethyl, 2,2-dichloro-3,3-dimethyl, dimethyldiethyl, trimethylethyl, 2,2-dimethyl-3-phenyl, trimethylphenyl and dimethylethylphenyl cyclopropane carboxylic acids. Acids of particular importance are for example 2,2-dimethyl, 2,3-dimethyl, 2,3,3-trimethyl, 2,2-dichloro-3,3-dimethyl and 2,2-dimethyl-3-phenyl.

The esters of the present invention can be prepared by conventional esterification methods, that is to say by reacting a cyclopentenolone of formula IV with an acid or derivative thereof of formula V:

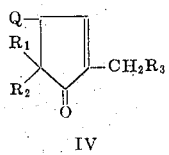 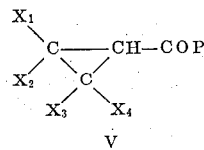

where $R_1$, $R_2$, $R_3$, $X_1$, $X_2$, $X_3$ and $X_4$ are as defined above and P and Q are functional groups which will react together to form an ester linkage. As mentioned above, it has been found convenient in practice to react a halogeno compound (Q = halogen) with a salt of the carboxylic acid (P = $O^-M^+$ where $M^+$ is preferably a silver or triethylammonium cation) but other known esterification techniques may also be used.

The halogeno compounds of the invention can be prepared from the appropriately substituted cyclopentenone of formula VI for example, by treating it with sulphuryl chloride to produce the 4-chloro or, preferably, with N-bromsuccinimide to give the 4-bromo compound. Other reagents capable of selective halogenation adjacent to a carbon to carbon double bond can also be used.

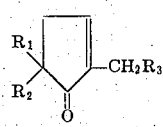

The 2-ene of formula VI is a known compound where $R_1$ and $R_2$ are hydrogen and $R_3$ is phenyl (2-benzyl-cyclo-pent-2-enone). In general, compounds of formula VI may be prepared by a condensation reaction between cyclopentanone and the aldehyde $R_2$CHO followed by an intramolecular rearrangement to produce the 2-ene as described in the literature (Conia & Amice, Bull. Soc. Chim. France 1968 P 3327).

Where one or both of $R_1$ and $R_2$ are other than hydrogen these radicals may be introduced by alkylation at the 5-position either of the 2-ene or of its immediate precursor.

One or more of the insecticidal esters of the invention may be formulated with an inert carrier or diluent to give insecticidal compositions and these may be prepared, for example, in the form of dusts and granular solids, wettable powders, mosquito coils and other solid preparations, or as emulsions, emulsifiable concentrates, sprays and aerosols and other liquid preparations after the addition of the appropriate solvents, diluents and surface active agents. Pyrethrum synergists such as piperonyl butoxide may also be added to the compositions.

The insecticidal compositions described above may be used for killing insects on a domestic or agricultural scale by treating the insects themselves where insect infestation has already taken place or by treating an environment susceptible to insect attack with the composition as a preventive measure.

The invention is illustrated in the following Examples (Temperatures are in °C.).

EXAMPLE 1

2-Benzylcyclopent-2-enone (4 g.), N-bromsuccinimide (4 g.) and carbon tetrachloride (15 ml.) with a trace of dry benzoyl peroxide are refluxed for 1½ hours, filtered, and the filtrate refluxed with silver (+), trans chrysanthemate (6.1 g.) for 4 hours. After cooling, the mixture is filtered, solvent removed by distillation, and the residue in benzene passed through a column of alumina (10 g.). Distillation of the eluate gives 1.7 g. of a fraction having b.p. 177°–181°/0.01 mm, $n_D$ 1.5400, shown to be 2-benzylcyclopent-2-enon-4-yl (+) trans chrysanthemate.

EXAMPLE 2

2-Benzylcyclopent-2-enone (5.4 g.), N-bromsuccinimide (5.5 g.) and carbon tetrachloride (40 ml) are refluxed for 2 hours, cooled, filtered, treated with silver 2,2,3,3-tetramethylcyclopropane carboxylate (6.9 g.) and refluxed for 4 hours. After cooling, the mixture is filtered, solvent removed by distillation, and the residue in benzene passed through a column of alumina (5 g.). Distillation of the eluate gives 1.5 g. of a fraction having b.p. 160°/0.01 mm, $n_D$ 1.5330, shown to be 2-benzylcyclopent-2-enone-4-yl 2,2,3,3-tetramethylcyclopropane carboxylate.

EXAMPLE 3

2-Benzylcyclopent-2-enone (5.0 g.), N-bromsuccinimide (5.15 g.) and carbon tetrachloride (40 ml) are refluxed for 2 hours, cooled, filtered, treated with silver (±)-2,2-dimethylcyclopropane carboxylate (5.4 g.) and the mixture refluxed for 4 hours. The product is isolated by the method described in Example 2 yielding 3.0 g. 2-benzylcyclopent-2-enone-4-yl-(±) -2,2-dimethylcyclopropane carboxylate, b.p. 153°–160°/0.02 mm, $n_D^{20}$ 1.5400.

EXAMPLE 4 a. A mixture of cyclopentanone (19.2 g.) and p-chlorobenzaldehyde (10.55 g.) is added dropwise during 1½ hours to a solution of sodium hydroxide (4.0 g.) in water (150 ml), then stirred at 20° for 4 hours, and neutralised with concentrated hydrochloric acid. The reaction mixture is then extracted with ether, and the extract washed with aqueous sodium carbonate, saturated sodium chloride, dried over sodium sulphate and distilled to give a fraction, b.p. 163°–165°/0.1 mm in 30% yield. This was recrystallised from pentane to give 2-(p-chlorobenzylidene) cyclopentanone m.p. 78°–80°. This is a new compound.

2-(p-Chlorobenzylidene) cyclopentanone (48.6 g.) in boiling methoxy-ethanol (500 ml) is treated dropwise with methoxy-ethanol (50 ml) saturated with dry hydrogen chloride gas during 1 hour, then boiled for 2 hours. Distillation gives 2-(p-chlorobenzyl) cyclopent-2-enone which is a new compound, b.p. 100°–106°/0.1 mm., $n_D^{20}$ 1.5698 in 50% yield.

b. 2-(p-chlorobenzyl) cyclopent-2-enone (4.14 g.) and N-bromsuccinimide (3.56 g.) in carbon tetrachloride (35 ml) is boiled for 2 hours, cooled, filtered, treated with silver (+)-trans chrysanthemate (5.5 g.) boiled for 4 hours, cooled, filtered and distilled. The product, 2-(p-chlorobenzyl) cyclopent-2-enone-4-yl (+)-trans chrysanthemate (1.6 g.) had b.p. 180°–195°/0.01 mm, $n_D^{20}$ 1.5392.

EXAMPLE 5 a. A mixture of cyclopentanone (101 g.) and p-methylbenzaldehyde (72 g.) is added to sodium hydroxide (30 g.) in water (1.2 l.) during 1 hour at 20°. Stirring is continued for 2½ hours, then concentrated hydrochloric acid added until mixture is neutral. The mixture is extracted with ether and the ether extract washed and dried as described in Example 4 and distilled to give 2-(p-methylbenzylidene)cyclopentanone, m.p. 63°–68°.

This product (39 g.) is rearranged on treatment with hydrogen chloride in hot methoxy-ethanol as described in Example 4 to give 2-(p-methylbenzyl) cyclopent-2-enone which is a new compound, b.p. 89°–91°/1mm, $n_D^{20}$ 1.5520, (13 g. 33% yield).

b. 2-(p-Methylbenzyl) cyclopent-2-enone (3.72 g.) and N-bromsuccinimide (3.56 g.) in carbon tetrachloride (35 ml) is refluxed for 1½ hours, cooled, filtered and boiled with silver (+)-trans chrysanthemate (5.5 g.) for 6 hours, cooled, filtered and distilled. The product (1.0 g.), 2-(p-methylbenzyl) cyclopent-2-enone-4-yl (+)-trans chrysanthemate, boiling at 176°–194°/0.01 mm, $n_D^{20}$ 1.5395.

The esters of the present invention may be incorporated as active ingredient in insecticidal compositions and the following Examples are given to illustrate typical formulations.

EXAMPLE 6
Oil-based liquid spray for household insects

| | |
|---|---|
| active compound | 0.015% w/v |
| 25% Pyrethrum Extract | 0.25% |
| Piperonyl butoxide | 0.5% |
| Antioxidant, e.g. "Topanol A" | 0.1% |
| Odourless light oil solvent, e.g. xylene to make | 100 vols. |

EXAMPLE 7
Water-based liquid spray concentrate for mosquito control

| | |
|---|---|
| active compound | 0.25% w/v |
| Piperonyl butoxide | 1.0% |
| Non-ionic emulsifier, e.g. "Ethylan BCP" | 0.25% |
| Antioxidant, e.g. "Topanol A" | 0.1% |
| Water to make | 100 vols. |

This concentrate should be diluted 1:80 v/v with water before spraying.

EXAMPLE 8
Aerosol

| | |
|---|---|
| active compound | 0.05% w/w |
| 25% Pyrethrum Extract | 0.8% |
| Piperonyl butoxide | 1.5% |
| Odourless petroleum distillate (b.p. 200–265°) | 17.338% |
| Propellant, e.g. a mixture of equal quantities of trichloromonofluoromethane and dichlorodifluoromethane | 80.0% |
| Perfume | 0.2% |
| Antioxidant, e.g. "Topanol A" | 0.1% |

EXAMPLE 9
Mosquito coil

| | |
|---|---|
| active compound | 0.25% w/w |
| Tabu powder or Staragel No. 1. | 30.0% |
| Filler(s), e.g. wood flour, powdered leaves or nut shells | 68.75% |
| Brilliant Green | 0.5% |
| p-Nitrophenol | 0.5% |

EXAMPLE 10
Emulsifiable concentrate

| | |
|---|---|
| active compound | 1.5% w/w |
| Non-ionic emulsifier, e.g. "Ethylan BCP" | 25.0% |
| Xylene | 73.4% |
| Antioxidant, e.g. "Topanol A" | 0.1% |

This concentrate may then be diluted at the rate of 30 mls. to 4½ litres of water prior to use.

EXAMPLE 11
General purpose powder for household, garden, livestock or grain storage use

| | |
|---|---|
| active compound | 0.05% w/w |
| Tropital | 0.25% |
| Antioxidant, e.g. butyl hydroxy toluene or butyl hydroxy anisole | 0.03% |
| Filler, e.g. Talc BPC | 99.67% |

In contact toxicity tests, the toxicity of compounds against house flies (adult female *Musea domestica L*) and mustard beetles (adult *Phaedon cochlearae Fab.*) was determined by applying a measured volume of an acetone solution containing a known weight of compound to the insect. An $LD_{50}$ value, the weight of compound required to kill 50% of the insects in a statistically significant sample was calculated and comparison of $LD_{50}$ values obtained under comparable conditions enables relative toxicity to be determined. In these tests, a relative toxicity of 100 was assigned to 5-benzyl-3-furylmethyl (+)cis-trans-chrysanthemate, a compound having an extremely high toxicity towards house flies and mustard beetles and which had, under conditions of the present test, $LD_{50}$ values of 0.01 micrograms per insect towards mustard beetles and 0.012 micrograms per insect towards house flies. To determine the effect of the synergist Sesamex (the 2-(2-ethoxyethoxy)-ethyl-3,4-methylene dioxyphenyl acetal of acetaldehyde), on the synthetic pyrethrins, 2 micrograms of Sesamex were applied to each test insect 2 hours before application of insecticide. $LD_{50}$ values were then calculated as before and a synergistic factor calculated by comparing $LD_{50}$ values with and without synergist. The knock-down effect of the insecticides was tested by determining the time taken for 50% of a sample of insects to be "knocked-down" under the influence of the insecticide under test. The following results were obtained.

| Test Compound | Relative Toxicity | | Synergistic factor (house flies) | Knock-down (house flies) |
|---|---|---|---|---|
| | Mustard Beetles | House Flies | | |
| 2-benzylcyclopent-2-enone-4-yl (+)-trans-chrysanthemate | 46 | 23 | 50–100 | high |
| 2-benzylcyclopent-2-enone-4-yl 2,2,3,3-tetramethyl cyclopropane carboxylate | 4.5 | 41 | — | fair |

| Test Compound | Relative Toxicity Mustard Beetles | Relative Toxicity House Flies | Synergistic factor (house flies) | Knock-down (house flies) |
|---|---|---|---|---|
| 2-benzylcyclopent-2-enone-4-yl (±)-2,2-dimethyl cyclopropane carboxylate | 1.0 | — | — | low |
| 2-(p-chlorobenzyl)-cyclopent-2-enone-4-yl (+)-trans-chrysanthemate | 4.8 | 7 | — | — |
| 2-(p-methylbenzyl)-cyclopent-2-enone-4-yl (+)-trans-chrysanthemate | 15 | 16 | — | — |
| 5-benzyl-3-furylmethyl (+)-trans-chrysanthemate | 270 | 240 | 7 | low |
| 5-benzyl-3-furylmethyl (±)-cis. trans-chrysanthemate | 100 | 100 | 12 | low |
| 2-benzyl-3-methyl-cyclopent-2-enone-4-yl (±)-cis-trans-chrysanthemate | 5.5 | 1.9 | — | — |
| natural pyrethrins | 36 | 6 | 200 | high |

We claim:

1. Cyclopentenones of the general formula:

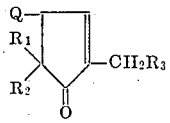

wherein Q represents a bromo group, $R_1$ and $R_2$, which may be the same or different, each represent hydrogen or an alkyl group containing one to six carbon atoms and $R_3$ represents a phenyl, halogeno phenyl or lower alkyl phenyl group.

2. A compound according to claim 1 which is 2-benzyl-4-bromo-cyclopent-2-enone, 2-(p-chlorobenzyl)-4-bromo-cyclopent-2-enone or 2-(p-methylbenzyl)-4-bromo-cyclopent-2-enone.

* * * * *

UNITED STATES PATENT OFFICE
CERTIFICATE OF CORRECTION

Patent No. 3,859,357            Dated  January 7, 1975

Inventor(s) Michael Elliott and Norman Frank James

It is certified that error appears in the above-identified patent and that said Letters Patent are hereby corrected as shown below:

In the heading insert --Claims priority British Application No. 34787/69 filed July 10, 1969--.

Column 2, line 41 change "telyl" to --tolyl--.

Column 2, line 57 change "X3=X4 - $CH_3$" to --X3=X4=$CH_3$--.

Column 4, line 1 change "(+),trans" to --(+)-trans.

UNITED STATES PATENT OFFICE
CERTIFICATE OF CORRECTION

Patent No. 3,859,357  Dated January 7, 1975

Inventor(s) Michael Elliott and Norman Frank James

It is certified that error appears in the above-identified patent and that said Letters Patent are hereby corrected as shown below:

Please add the following claim:

--3. Cyclopentenones according to Claim 1 wherein $R_1$ and $R_2$ each represent hydrogen.--

Signed and Sealed this eleventh Day of May 1976

[SEAL]

Attest:

RUTH C. MASON
Attesting Officer

C. MARSHALL DANN
Commissioner of Patents and Trademarks